United States Patent
Baitz et al.

(10) Patent No.: US 8,400,768 B2
(45) Date of Patent: Mar. 19, 2013

(54) COMPUTER CASE

(75) Inventors: Guenter Baitz, Berlin (DE); Uwe Kirschke, Berlin (DE); Matthias Lenz, Schoenfliess (DE)

(73) Assignee: Wincor Nixdorf International GmbH (DE)

(*) Notice: Subject to any disclaimer, the term of this patent is extended or adjusted under 35 U.S.C. 154(b) by 207 days.

(21) Appl. No.: 12/812,619

(22) PCT Filed: Jan. 8, 2009

(86) PCT No.: PCT/EP2009/000047
§ 371 (c)(1),
(2), (4) Date: Jul. 13, 2010

(87) PCT Pub. No.: WO2009/092515
PCT Pub. Date: Jul. 30, 2009

(65) Prior Publication Data
US 2010/0284141 A1 Nov. 11, 2010

(30) Foreign Application Priority Data
Jan. 23, 2008 (DE) .................. 10 2008 005 725

(51) Int. Cl.
*G06F 1/16* (2006.01)
*H05K 5/00* (2006.01)
*H05K 7/00* (2006.01)
(52) U.S. Cl. .................. 361/679.6; 361/679.02
(58) Field of Classification Search ............. 361/679.02, 361/679.31–679.44, 679.57, 679.58, 679.6
See application file for complete search history.

(56) References Cited

U.S. PATENT DOCUMENTS

| | | | | |
|---|---|---|---|---|
| 5,051,868 A | * | 9/1991 | Leverault et al. | 361/679.6 |
| 5,172,305 A | * | 12/1992 | DeWilde | 361/796 |
| 5,774,330 A | * | 6/1998 | Melton et al. | 361/679.32 |
| 5,777,848 A | | 7/1998 | McAnally et al. | |
| 5,784,251 A | * | 7/1998 | Miller et al. | 361/679.6 |
| 5,784,252 A | | 7/1998 | Villa et al. | |
| 5,973,918 A | | 10/1999 | Felcman et al. | |
| 6,000,767 A | * | 12/1999 | Liu et al. | 312/223.2 |
| 6,215,664 B1 | * | 4/2001 | Hernandez et al. | 361/725 |
| 6,356,438 B1 | * | 3/2002 | Leman et al. | 361/679.4 |
| 6,430,041 B1 | * | 8/2002 | Johnson et al. | 361/679.48 |
| 6,466,448 B1 | * | 10/2002 | Baik | 361/752 |
| 6,530,628 B1 | | 3/2003 | Huang et al. | |
| 6,813,156 B2 | * | 11/2004 | Park | 361/725 |
| 7,046,517 B2 | * | 5/2006 | Long et al. | 361/725 |
| 7,254,018 B2 | * | 8/2007 | Zhang et al. | 361/679.33 |
| 7,257,827 B2 | * | 8/2007 | Lee | 720/653 |

(Continued)

FOREIGN PATENT DOCUMENTS

| | | |
|---|---|---|
| DE | 44 47 003 A1 | 7/1996 |
| DE | 297 21 480 U1 | 3/1998 |

(Continued)

*Primary Examiner* — Adrian S Wilson
(74) *Attorney, Agent, or Firm* — Harness, Dickey & Pierce, P.L.C.

(57) ABSTRACT

The invention relates to a computer case, comprising a case top, a case base, two lateral walls, a rear wall and a front cover, the case top being detachably retained at least on the rear wall and a power supply unit being arranged on one of the lateral walls. The computer case according to the invention is characterized in that the lateral wall on which the power supply unit is arranged is swiveled to the case base.

18 Claims, 10 Drawing Sheets

U.S. PATENT DOCUMENTS

| | | |
|---|---|---|
| 7,365,971 B2 * | 4/2008 | Chen et al. ............... 361/679.33 |
| 7,548,416 B2 * | 6/2009 | Lin et al. ................. 361/679.33 |
| 2003/0193782 A1 * | 10/2003 | Chen ............................ 361/726 |
| 2004/0075979 A1 | 4/2004 | Wang et al. |
| 2005/0185373 A1 * | 8/2005 | Chen et al. .................... 361/685 |
| 2007/0285882 A1 | 12/2007 | Chen |
| 2008/0123280 A1 * | 5/2008 | Chen et al. .................... 361/685 |
| 2008/0130245 A1 * | 6/2008 | Chen et al. .................... 361/726 |
| 2008/0137280 A1 * | 6/2008 | Chen et al. .................... 361/685 |
| 2008/0218958 A1 * | 9/2008 | Chen et al. .................... 361/684 |

FOREIGN PATENT DOCUMENTS

DE      201 10 253 U1      9/2001

* cited by examiner

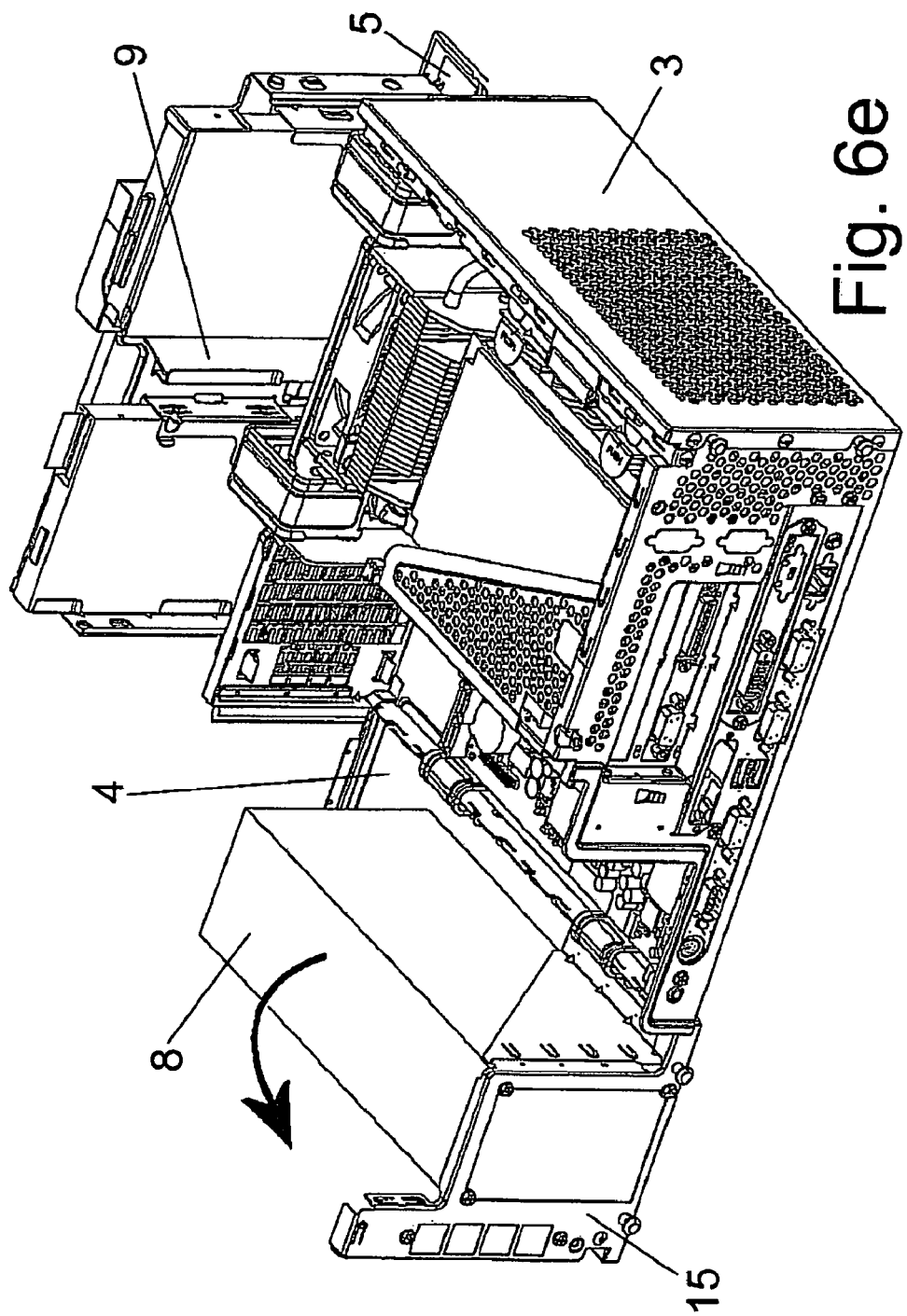

COMPUTER CASE

CROSS-REFERENCE TO RELATED APPLICATIONS

This application is a National Stage of International Application No. PCT/EP2009/000047, filed Jan. 8, 2009. This application claims the benefit and priority of German application 10 2008 005 725.8, filed Jan. 23, 2008. The entire disclosures of the above applications are incorporated herein by reference.

BACKGROUND

This section provides background information related to the present disclosure which is not necessarily prior art.

TECHNICAL FIELD

The present invention relates to a computer case.

DISCUSSION

Computer cases are known per se. They are normally designed such that at least a case top can be removed from the rest of the computer case to allow access to the computer components located in the interior of the computer. Since only limited space is available to house the individual components, said individual components, such as the computer mother board for example, can often only be reached with great difficulty because other components, such as disc drives or fans, are mounted above the mother board. Consequently, in order to reach certain components, said obstructive components first have to be removed, which is time-consuming and thus costly.

SUMMARY OF THE INVENTION

An object of the present invention is therefore to eliminate these aforementioned disadvantages and to provide a computer case that allows easier access to normally concealed components.

Due to the pivotable attachment of the lateral wall to which the power supply unit is attached, said lateral wall can be swung away outward without difficulty for maintenance operations on components located under the power supply unit when in the operating mode and thus allows easy access to components located under the power supply unit.

Additional advantageous embodiments of the invention are identified in the dependent claims.

As the result of the front cover being similarly pivotably attached to the case base, disc drive carriers located on the front cover can firstly serve to securely retain the lateral wall to the power supply unit and secondly permit both rapid and easy access to the components located under the disc drive carrier.

The latching of the lateral wall on which the power supply unit is arranged to a mounting plate firmly attached to the case base firstly allows the lateral wall to be securely retained and secondly creates a rapid and simple opportunity for detaching the lateral wall from the mounting plate in the event of maintenance.

Latching of the lateral wall by means of clamps or detent catches proves to be particularly advantageous.

BRIEF DESCRIPTION OF THE DRAWINGS

Embodiments are described hereinafter using the appended drawings.

The drawings described herein are for illustrative purposes only of selected embodiments and not all possible implementations, and are not intended to limit the scope of the present disclosure.

FIGS. 6a to 6e show the procedure for exposing components in the computer case located under the power supply unit.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

In the following description of the Figures, terms such as top, bottom, left, right, front, rear, etc. refer solely to the representation and position of the computer case and other parts selected as an example in the respective figures. These terms are not to be understood as restrictive, meaning that in different operating positions or as the result of mirror-image layouts or similar these references can change.

Figure 1:
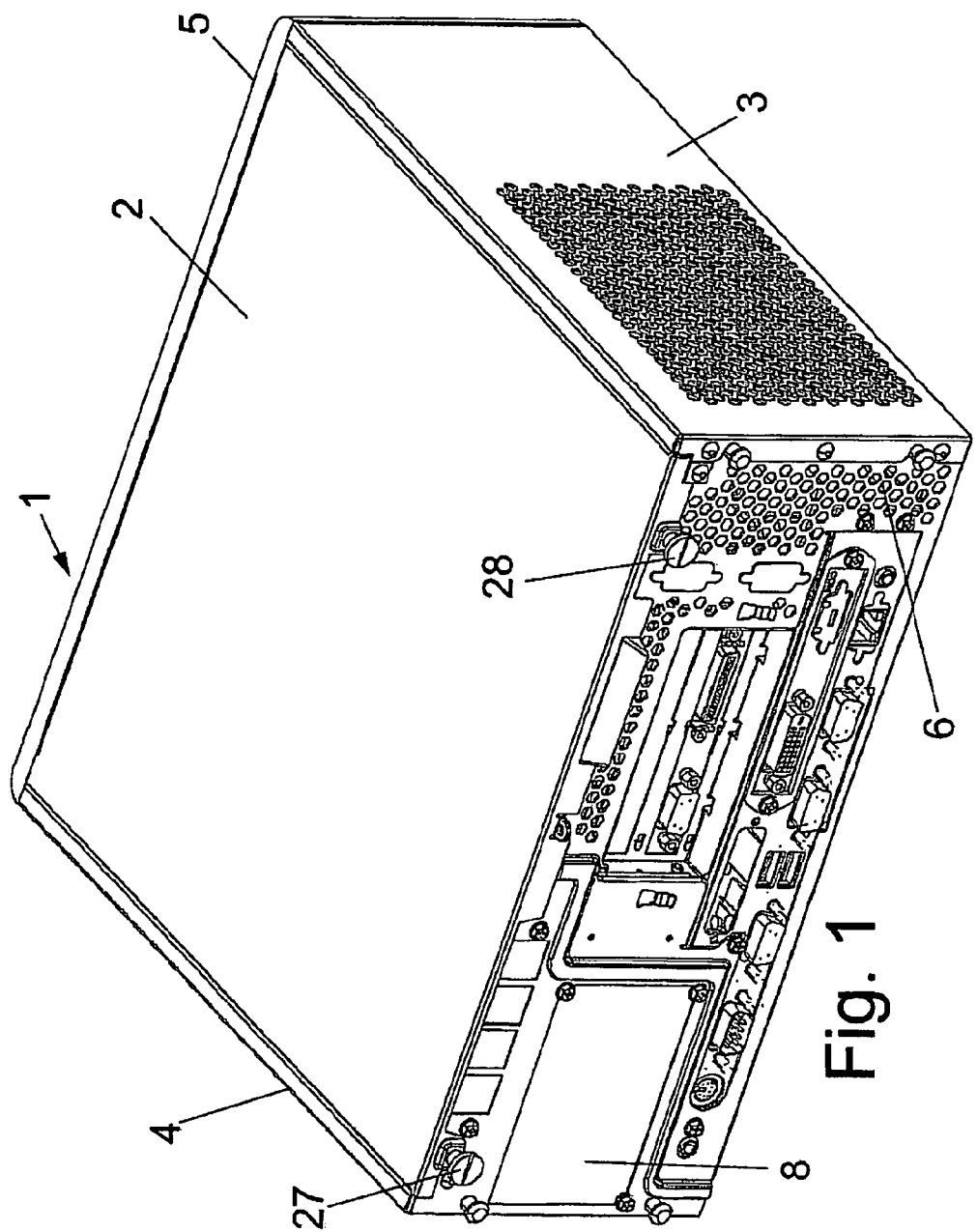
FIG. 1 shows a perspective view of a computer case in accordance with the invention in the closed state.

FIG. 1 shows a perspective view of a computer case in accordance with the invention in the closed state. The computer case 1 consists of a case top 2, a case base 7, which cannot be seen in this Figure, two lateral walls 3 and 4, a front cover 5 and a case rear wall 6. The edge of the case top 2 facing the case rear wall is bent over at least partially towards the case base 7 and detachably retained to the case rear wall 6 by two bolts 27, 28. The opposite edge of the case top 2 facing the front cover 5 extends in the attached state slightly under an edge of the front cover 5 that is bent over towards the case top 2.

Figure 2:
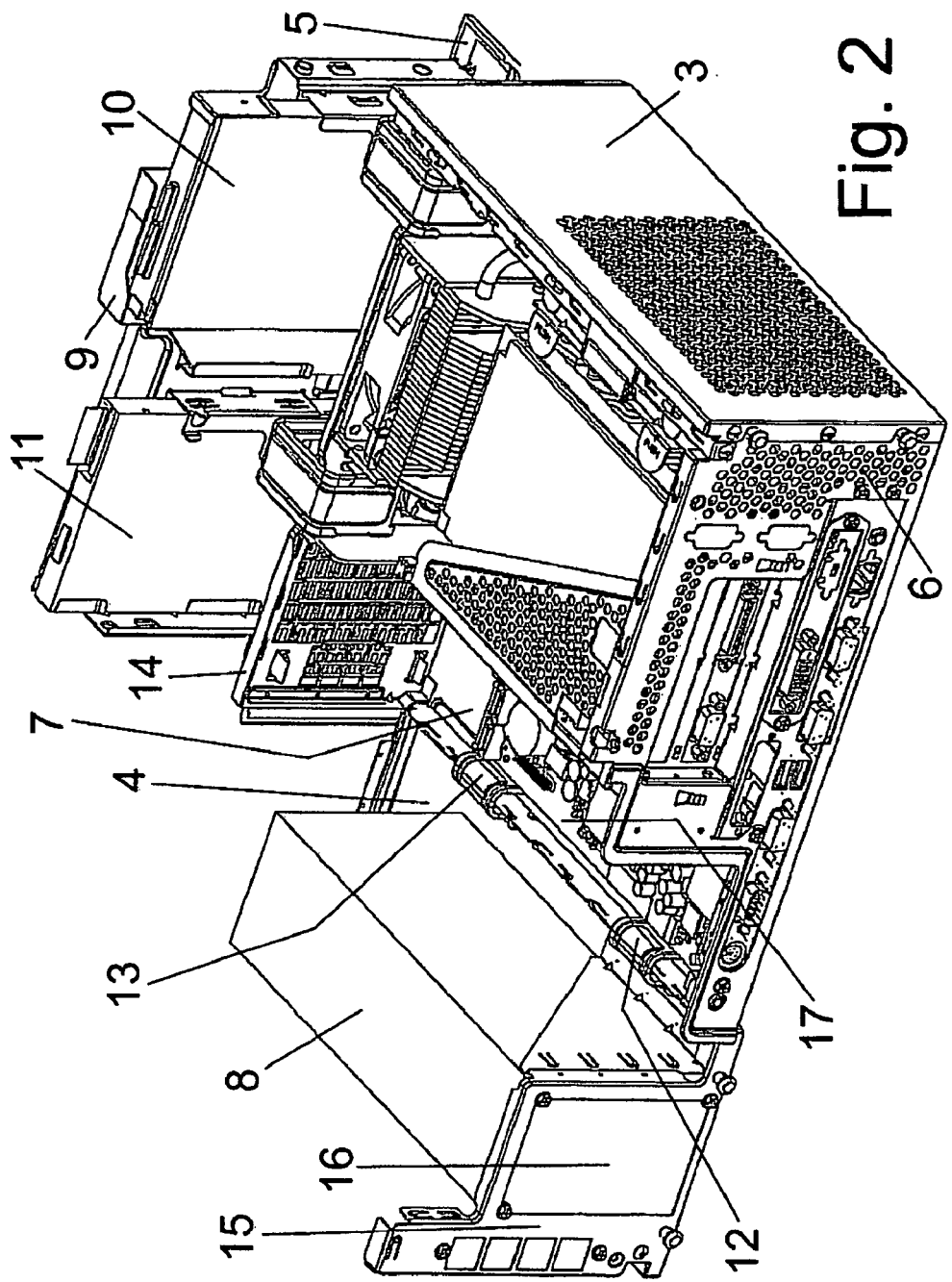
FIG. 2 shows a perspective view of a computer case in accordance with the invention in the open state, with a lateral wall swung out and front cover swung out.

FIG. 2 shows the computer case in the opened state and with the case top 2 removed. In the representation shown here, it can be seen that the case front 5 is swung toward the front, or pivoted over, away from the rest of the computer case. At least one disc drive carrier 9 is arranged on the case front 5 to receive at least one disc drive, two disc drives 10, 11 in the representation of a preferred embodiment shown, said carrier being swung down forward together with the case front 5 when the case front 5 is swung down. This exposes the computer components arranged under the disc drives 10, 11.

One of the lateral walls 4 of the computer case is swung out away from the computer case. A power supply unit 8 is arranged on this lateral wall so that when the lateral wall 4 is swung down the power supply unit 8 can be pivoted away outward together with the lateral wall 4. The lateral wall 4 is preferably attached to the case base 7 by hinges 12, 13 that are positioned next to each other, attached to the edges of the lateral wall and the case base 7.

The front cover 5 of the computer case is preferably attached in the same way to the case base 7, so that the disc driver carrier 9 arranged on the front cover 5 of the computer case is pivotably attached to the case base.

At least one of the disc drive carriers 9, having been pivoted inward, extends so far into the interior of the computer case that it locks the power supply unit 8 into the computer case when said unit has been pivoted inward. This locked condition preferably results from the overlapping of partial surfaces of the power supply unit and of the disc driver carrier when said power supply unit and said disc drive carrier have been pivoted inward, and thus it is impossible for the power supply unit to swing outward without the disc drive carrier having been previously pivoted forward.

Figure 3:
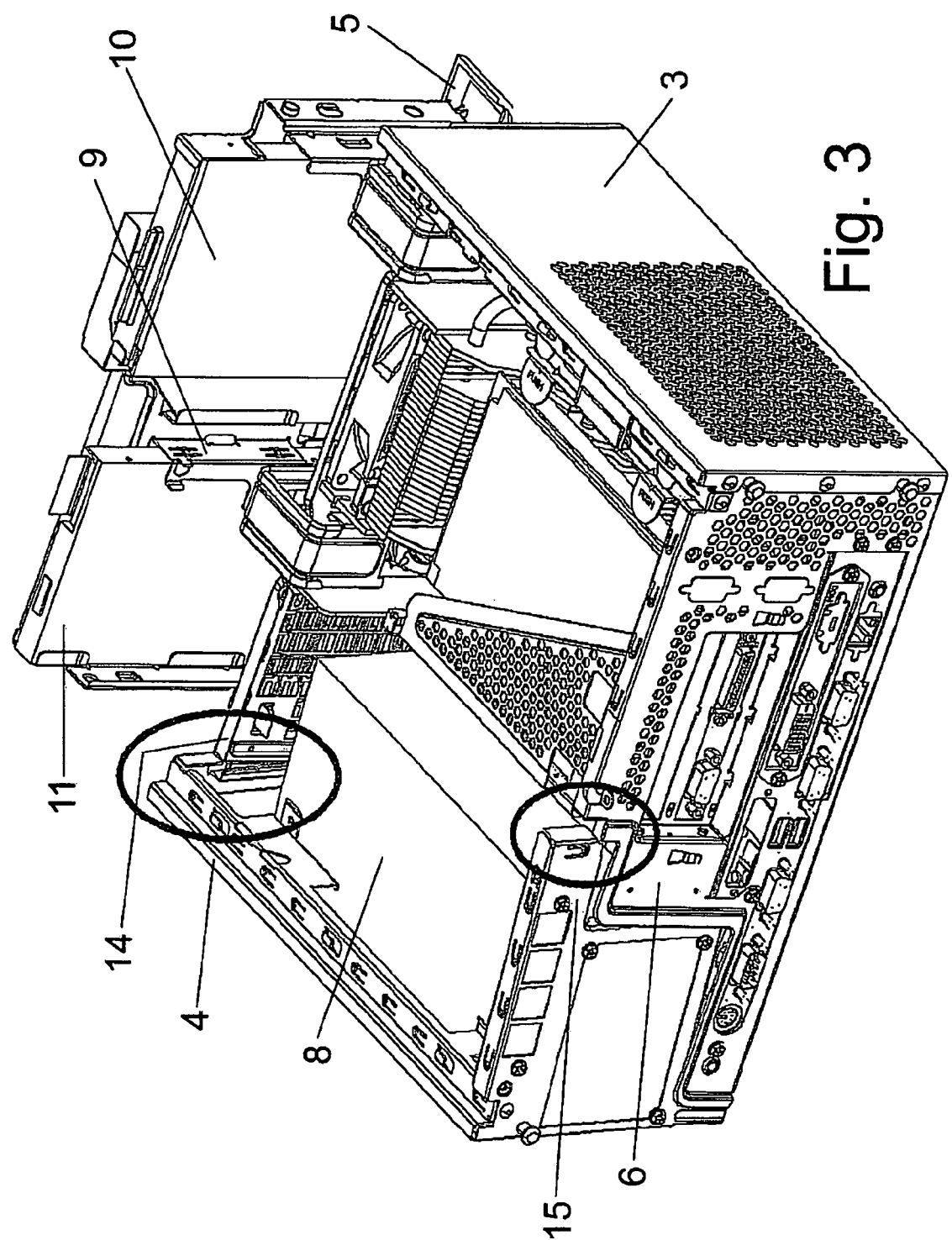
FIG. 3 shows a perspective view of a computer case in accordance with the invention in the partially closed state, with front cover swung out and lateral wall swung in almost completely.
Figure 4:
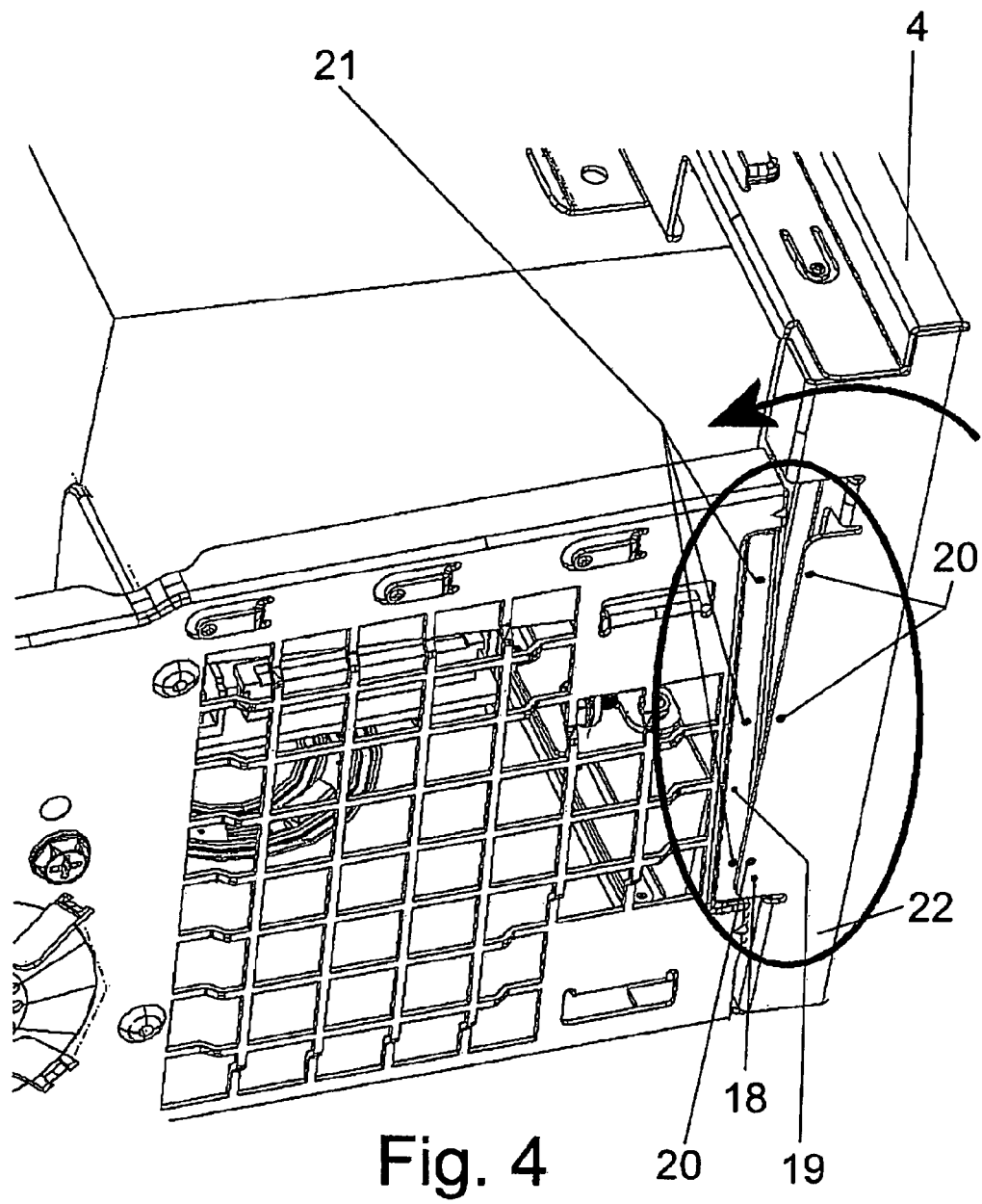
FIG. 4 shows a detailed view of a device for latching the fold-down lateral wall to a mounting plate.
Figure 5:
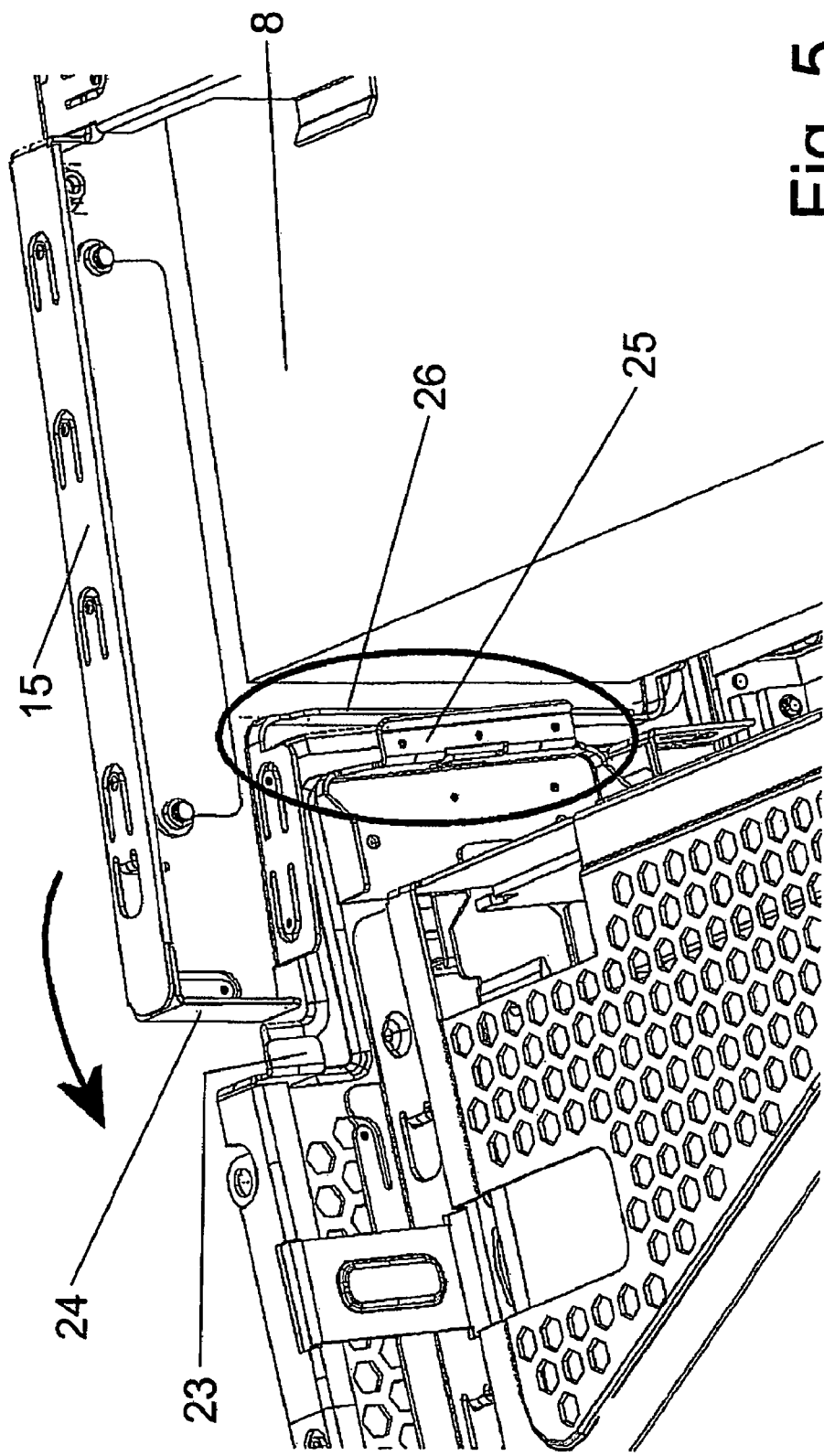
FIG. 5 shows a detailed view of a device for latching the fold-down lateral wall to a case rear wall.

FIGS. 3 to 5 show overall and detailed views of the latching devices of the pivotable lateral wall and of the pivotable front cover. In the representation shown in FIG. 3, the front cover 5 of the computer case is swung forward and the lateral wall 4 with the power supply unit 8 is almost closed. The two circles in FIG. 3 indicate the locations on the computer case at which the front cover 5 and the lateral surface 4 are locked. As can be seen especially well in this Figure and also in FIG. 2, one part of the computer case rear wall 15 and the lateral wall 4 on which the power supply unit 8 is arranged, are configured in one piece so that the power supply unit 8 is enclosed from two sides by this lateral wall 4 and a part of the rear wall 15. The contour of the rear wall 15 is preferably shaped in such a manner that the part of the rear wall 15 firstly completely surrounds one face 16 of the power supply unit 8, and secondly it is configured with a projecting tab in the upper part facing the case top. The other part of the case rear wall 6 is shaped to match the contour of the part of the rear wall at its left edge in FIGS. 2 and 3 so that the two parts of the rear wall 6 and 15 engage each other in the closed position of the lateral wall 4 and can be locked together.

The attachment of the lateral wall 4 to the front cover 5 is shown in detail in FIGS. 4 and 5. The attachment of the lateral wall 4 to a mounting plate 14 that projects vertically from the case base 7 in the area of the case front 5 is shown in FIG. 4. The edges of the mounting plate 14 and of the lateral wall 4 lying opposite each other preferably have interlocking edge areas 19 and 22 that are provided with holes 20, 21 through which preferably bolts can be inserted and in this way the lateral wall 4 is attached to the mounting plate 14. Alternatively, it is also conceivable for the lateral wall 4 to be attached to the mounting plate 14 by clamping their respective edges together.

The locking device shown in FIG. 5 consists preferably of an edge of the back wall 6 facing the back wall part 15 which an edge of the back wall part 15 facing the back wall part 15 overlaps. These two edges are preferably provided with holes through which preferably bolts can be inserted and thus hold the two parts of the back wall 5 and 15 together. Clamping the two edges is also conceivable, in the manner already described in attaching the lateral plate 4 to the mounting plate 14.

FIGS. 6a to 6e show an example of the procedure for gaining access to the mother board lying under the power supply unit.

Figure 6A:
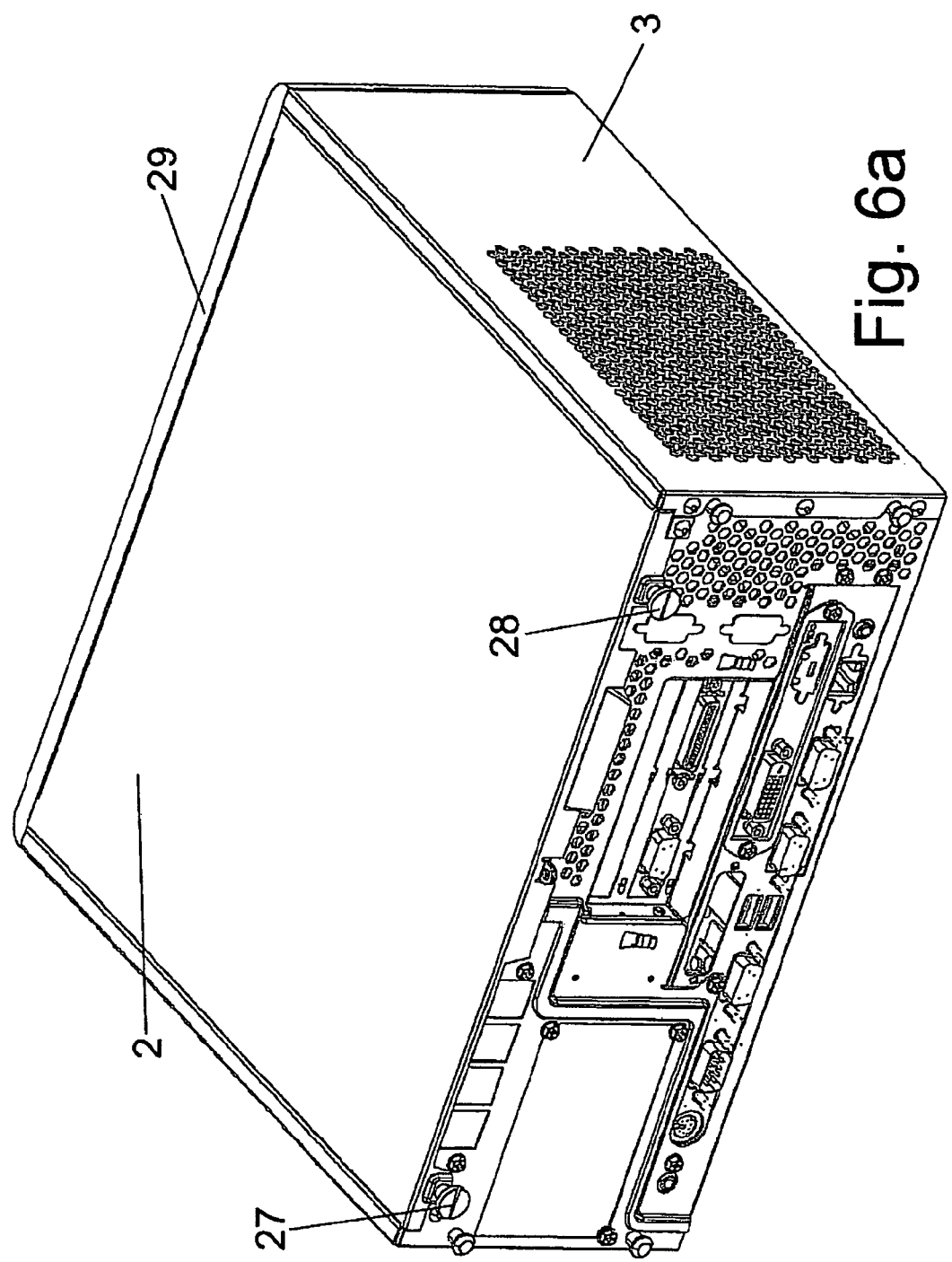
Figure 6B:
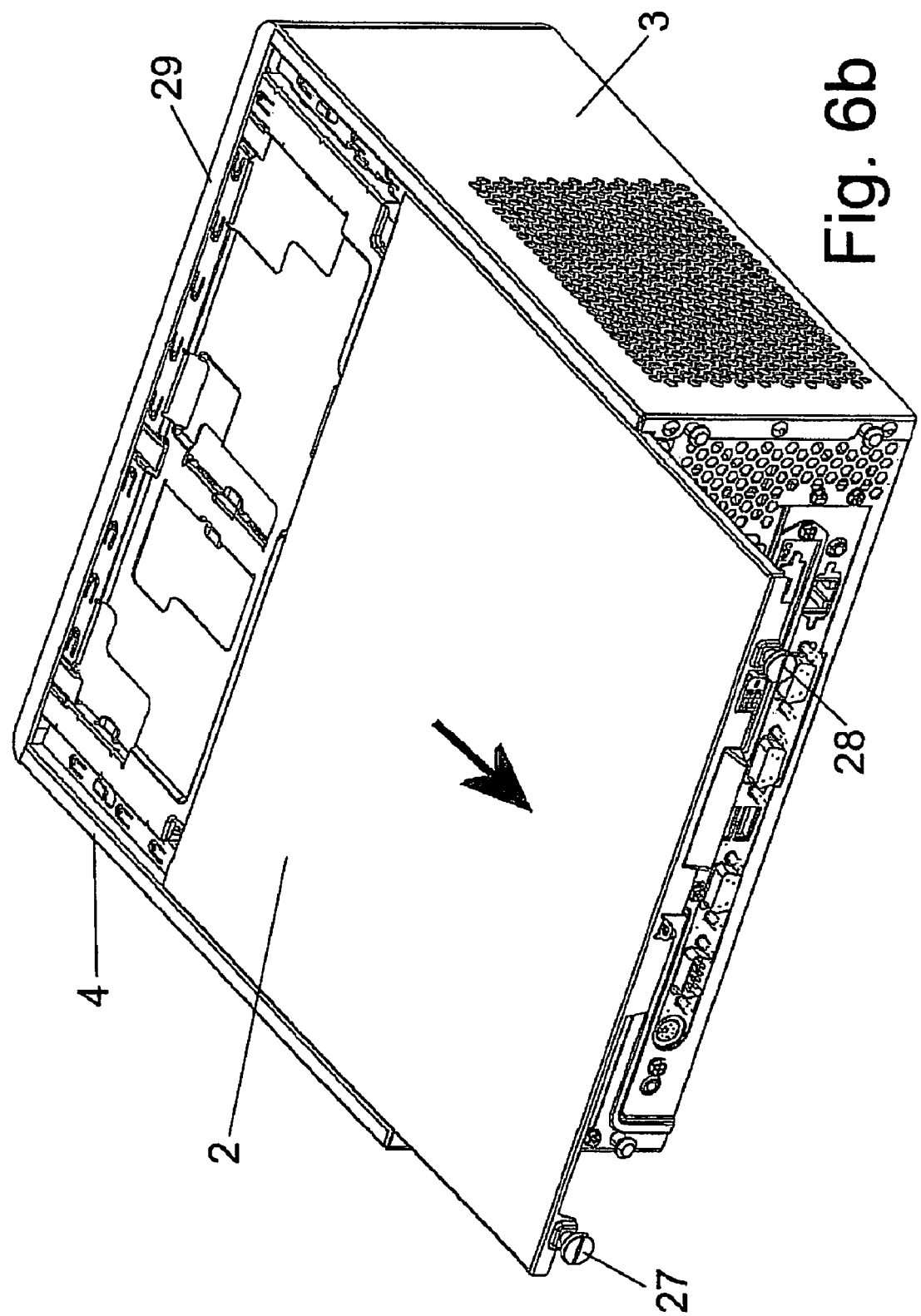

FIG. 6a shows how the case top 2 is removed from the rest of the case after loosening the two bolts 27, 28 from the back side of the case.

Figure 6C:
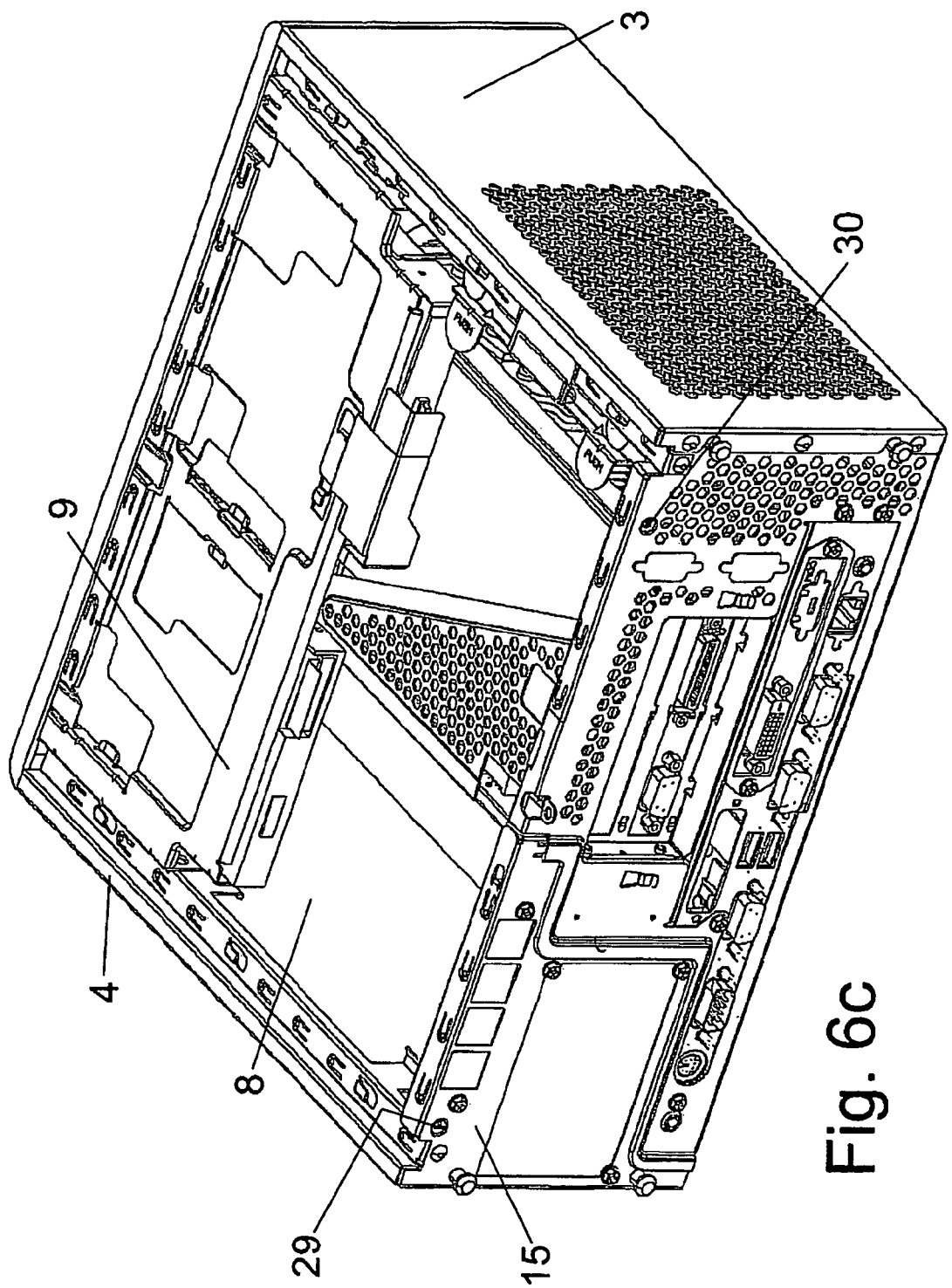

FIG. 6c shows the open computer case without the case top 2. In this view, the case front 5 is still in the closed position, as the result of which the disc drive carrier 9 is still preventing the lateral wall 4 from being swung down.

Figure 6D:
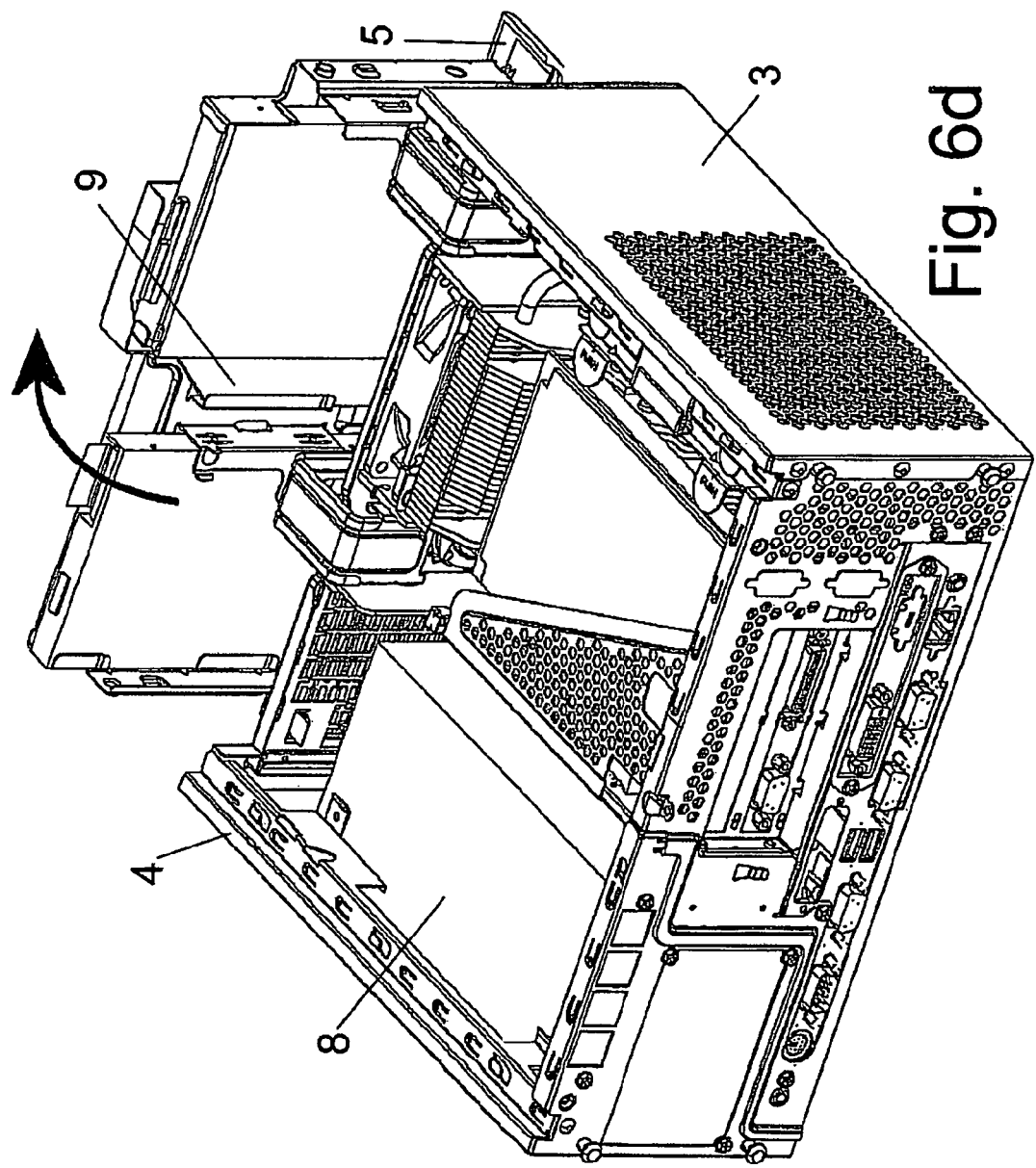

FIG. 6d shows in the next step the case front 5 swung forward with the resulting exposure of the components located under the disc drive carrier 9.

FIG. 6e finally shows the computer case with the case front 5 pivoted forward and the lateral surface 4 pivoted to the side, whereby the power supply unit 8 is pivoted to the side at the same time, so that the mother board 17 located under the power supply unit 8 is freely accessible. This creates a quick and simple opportunity of reaching the computer mother board 17.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. Computer case, comprising a case base, two lateral walls, a rear wall and a front cover, a case top being detachably retained at least at the rear wall, and a power supply unit is arranged on one of the lateral walls, characterized in that the lateral wall on which the power supply unit is arranged is pivotably attached to the case base;
   wherein at least one disc drive carrier is arranged on the front cover and the front cover is pivotably attached on the case base; and
   wherein, with the power supply unit and the disc drive carrier having been pivoted inward, partial areas of the power supply unit and of the disc drive carrier overlap.

2. Computer case from claim 1, wherein the lateral wall on which the power supply unit is arranged and at least one part of the rear wall extending at least across one part of a front face of the power supply unit are configured in one piece.

3. Computer case from claim 1, wherein the lateral wall on which the power supply unit is arranged and the case base are attached to each other with at least one hinge.

4. Computer case from claim 1, wherein the front cover and the case base are attached to each other with at least one hinge.

5. Computer case from claim 1, wherein at least one of the disc drive carriers, having been pivoted inward, locks the power supply unit, when the lateral wall on which the power supply unit is arranged has been pivoted inward.

6. Computer case from claim 1, wherein the lateral wall on which the power supply unit is arranged can be locked in the pivoted-in position to a mounting plate projecting vertically from the case base in the area of the case front and solidly connected to said case base.

7. Computer case from claim 1, wherein the lateral wall on which the power supply unit is arranged, can be locked to the rear wall in the pivoted-in position.

8. Computer case from claim 6, wherein the lateral wall on which the power supply unit is arranged, can be locked in the pivoted-in position by being bolted.

9. Computer case from claim 6, wherein the lateral wall on which the power supply unit is arranged, can be locked in the pivoted-in position by clamping.

10. Computer case from claim 6, wherein the lateral wall on which the power supply unit is arranged can be locked in the pivoted-in position by detent catches.

11. A computer case comprising:
   a case base;
   a rear wall;
   a front cover including a disc drive carrier mounted thereto, the front cover is pivotably attached to the case base and movable between a closed position in which the disc drive carrier opposes the case base and an open position in which the disc drive carrier is offset from the case base to permit access to the case base;

a first lateral wall;

a second lateral wall including a power supply unit mounted thereto, the second lateral wall is pivotably attached to the case base and movable between a closed position in which the power supply unit opposes the case base and an open position in which the power supply unit is offset from the case base to permit access to the case base; and a case top configured to be detachably retained at least at the rear wall;

wherein the disc drive carrier overlaps the power supply unit when the front cover is in the closed position and the second lateral wall is in the closed position.

12. The computer case of claim 11, wherein the second lateral wall is configured to be locked in the closed position through cooperation between the second lateral wall and each of the rear wall and a mounting plate proximate to the front cover.

13. The computer case of claim 11, wherein each of the disc drive carrier and the power supply unit are spaced apart from the case top.

14. The computer case of claim 11, wherein the front cover extends generally perpendicular to the case base when in the closed position and the second lateral wall extends generally perpendicular to the case base when in the closed position.

15. The computer case of claim 11, wherein the rear wall includes a first portion directly attached to the first lateral wall and a second portion directly attached to both the second lateral wall and the power supply unit, the second portion is configured to pivot with the second lateral wall between the open position and the closed position, the second portion contacts the first portion when the second lateral wall is in the closed position, the second portion is spaced apart from the first portion when the second lateral wall is in the open position.

16. The computer case of claim 11, wherein the power supply is mounted to both the second lateral wall and the rear wall.

17. A computer case comprising:

a case base, a front end of the case base, a rear end of the case base opposite to the front end, a first side of the case base, and a second side of the case base opposite to the first side, the first side extends between the front end and the rear end, and the second side extends between the front end and the rear end;

a rear wall extending from the rear end generally perpendicular to the case base;

a front cover pivotably attached to the front end of the case base;

a disc drive carrier mounted to an interior surface of the front cover, the front cover pivotable between a closed position in which the disc drive carrier extends generally parallel to the case base and opposes the case base, and an open position in which the disc drive carrier is offset from the case base to permit access to components mounted to the case base;

a first lateral wall extending from the first side of the case base generally perpendicular to the case base; and a second lateral wall pivotably attached to the second side of the case base with a power supply mounted thereto, the second lateral wall is pivotable between a closed position in which the power supply is opposed to the case base and an open position in which the power supply is offset from the case base to permit access to components mounted to the case base; and a case top configured to be removably attached to the rear wall and cover the case base by extending from the rear wall to the front cover, and from the first lateral wall to the second lateral wall;

wherein the disc drive carrier overlaps the power supply when the front cover is in the closed position and the second lateral wall is in the closed position.

18. The computer case of claim 17, wherein the rear wall includes a first portion directly attached to the first lateral wall and a second portion directly attached to both the second lateral wall and the power supply unit, the second portion is configured to pivot with the second lateral wall between the open position and the closed position, the second portion contacts the first portion when the second lateral wall is in the closed position, the second portion is spaced apart from the first portion when the second lateral wall is in the open position.

* * * * *